(12) United States Patent
Raukas et al.

(10) Patent No.: US 7,014,792 B2
(45) Date of Patent: Mar. 21, 2006

(54) EUROPIUM-ACTIVATED BARIUM MAGNESIUM ALUMINATE PHOSPHOR

(75) Inventors: Madis Raukas, Charlestown, MA (US); Kailash C. Mishra, Chelmsford, MA (US); Robert T. McSweeney, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 115 days.

(21) Appl. No.: 10/665,257

(22) Filed: Sep. 20, 2003

(65) Prior Publication Data

US 2005/0064250 A1 Mar. 24, 2005

(51) Int. Cl.
*C09K 11/64* (2006.01)
(52) U.S. Cl. .................... 252/301.4 R; 252/301.4 F
(58) Field of Classification Search ......... 252/301.4 R, 252/301.4 F
See application file for complete search history.

(56) References Cited

U.S. PATENT DOCUMENTS 6,960,309 B1 * 11/2005 Aoki et al. ........... 252/301.4 R

FOREIGN PATENT DOCUMENTS

| EP | 1 426 430 A1 | | 6/2004 |
| JP | 2003-82344 | * | 3/2004 |
| WO | WO 03/025089 | * | 3/2003 |

* cited by examiner

*Primary Examiner*—C. Melissa Koslow
(74) *Attorney, Agent, or Firm*—Robert F. Clark

(57) ABSTRACT

A europium-activated barium aluminate phosphor is described wherein the phosphor is doped with tetravalent ions of Hf, Zr, or Si. Preferably, the phosphor is represented by $(Ba_{1-x}Eu_x)MgAl_{10}O_{17}:(Hf,Zr,Si)_y$ where $0.05 \leq x \leq 0.25$ and $0 < y \leq 0.05$. The tetravalent dopant ions are shown to enhance the stability of the phosphor in UV/VUV applications.

21 Claims, No Drawings

EUROPIUM-ACTIVATED BARIUM MAGNESIUM ALUMINATE PHOSPHOR

TECHNICAL FIELD

The present invention is related generally to barium magnesium aluminate (BAM) phosphors and methods for enhancing their performance in lighting and display applications. More particularly, the present invention is related to increasing the thermal stability and radiance maintenance of europium-activated BAM phosphors in highly loaded fluorescent lamps and plasma display panels.

BACKGROUND OF THE INVENTION

Europium-activated barium magnesium aluminate (BAM) phosphors are widely used as the blue-emitting component of the phosphor blends in most fluorescent lamps intended for white light generation. BAM phosphors also serve as the blue-emitting pixels in plasma display panels (PDPs). Despite its wide use, BAM is notorious for its shortcomings in brightness and maintenance, particularly in those applications involving exposure to high ultraviolet (UV) and vacuum ultraviolet (VUV) fluxes. Because of these shortcomings, the blue BAM emission is reduced at a significantly faster rate over time than the emissions of the other color components in the blends or pixels. This results in a loss of lumens and a color shift in the overall light output.

Theoretical and experimental investigations of various BAM compositions over the past few years have yielded clues about the degradation mechanisms involved in the phosphor's maintenance. A prolonged exposure to radiation with photons having energies above 5 eV (wavelengths less than 254 nm) causes a reduction in the phosphor's brightness and changes in the spectral power distribution of the phosphor's emission. These effects can be observed by spectroscopic methods after hundreds of hours of lamp operation or by a short period of high-intensity laser irradiation (e.g., a 193 nm excimer laser). In addition to an approximate 25% decrease in brightness after 500 hours of operation, there is an increase in the long wavelength side of the emission band of the phosphor. Very likely, these effects are linked to electron and hole centers formed during the phosphor synthesis and/or later generated as a result of ion bombardment and UV/VUV irradiation during lamp operation. In particular, electron centers (oxygen vacancies that have captured zero, one or two electrons) are believed to compete with the europium activator ions for UV/VUV photons and may also absorb a portion of the visible light emissions from the phosphor. It is also possible that oxygen vacancies with zero or one electron may capture electrons produced, for example, from the photoionization of $Eu^{2+}$ to $Eu^{3+}$ upon 185 nm UV irradiation. If the number of defects capable of capturing electrons from the ionization of the europium activator ions is comparable to the number of europium ions in the lattice, or becomes so during the operating life of the phosphor, a serious reduction of the emission intensity will follow over time.

SUMMARY OF THE INVENTION

We have discovered that by replacing some of the cations ($Ba^{2+}$, $Eu^{2+}$, $Mg^{2+}$ and $Al^{3+}$) in europium-activated barium magnesium aluminate phosphors with tetravalent cations of silicon, hafnium, and zirconium ($Si^{4+}$, $Hf^{4+}$ and $Zr^{4+}$) the performance of the BAM phosphors in certain UV/VUV applications is improved. It is believed that the introduction of the tetravalent cations into the BAM lattice reduces the probability of forming the oxygen vacancies which lead to the degradation of the phosphor. Silicon, hafnium and zirconium were chosen because of their stable 4+-valence state in varying conditions. The tetravalent dopants may be used individually or in combination.

The BAM phosphor of this invention preferably contains from about 1 to about 5 weight percent of the europium activator, and more preferably about 2 weight percent europium. The dopant amounts preferably range from greater than 0 to about 2000 parts-per-million (ppm) silicon by weight, from greater than 0 to about 12500 ppm hafnium by weight, and from greater than 0 to about 6500 ppm zirconium by weight. More preferably, the dopant amounts range from about 100 to about 400 ppm silicon by weight, from about 600 to about 2500 ppm hafnium by weight, and from about 300 to about 1300 ppm by weight zirconium. Even more preferred, the dopant amounts range from about 100 to about 200 ppm silicon by weight, from about 600 to about 1300 ppm hafnium by weight, and from about 300 to about 650 ppm zirconium by weight.

In an alternative embodiment, the phosphors of this invention may be represented by $(Ba_{1-x}Eu_x)MgAl_{10}O_{17}$:(Hf, Zr, Si)$_y$ where $0.05 \leq x \leq 0.25$ and $0 < y \leq 0.05$; preferably, $0.0025 \leq y \leq 0.01$; and, more preferably, $0.0025 \leq y \leq 0.005$.

DETAILED DESCRIPTION OF THE INVENTION

For a better understanding of the present invention, together with other and further objects, advantages and capabilities thereof, reference is made to the following disclosure and appended claims.

A series of europium-activated barium magnesium aluminate phosphors were prepared with Hf, Zr and Si dopants. The phosphors had a composition which may be represented by the formula $(Ba_{0.90}Eu_{0.10})MgAl_{10-y}O_{17}$:(Hf, Zr, Si)$_y$. The performance of these phosphors was compared with a control phosphor, $(Ba_{0.90}Eu_{0.10})MgAl_{10}O_{17}$, made under the same conditions. Three different dopant levels were used: 0.02, 0.1, and 0.5 mole %. In each case, the molar amount of the tetravalent dopant ion was substituted for an equal molar portion of aluminum.

In a preferred method, the phosphors were made by combining stoichiometric amounts of the phosphor precursor compounds: $BaCO_3$ (0.800 moles), $BaF_2$ (0.100 moles) $Eu_2O_3$ (0.050 moles), MgO (1.000 mole), $Al(OH)_3$ (10.0000−x moles), $HfOCl_2 \cdot 8H_2O$ (x=0.0002, 0.0010, and 0.0050 moles), $ZrO(NO_3)_2$ (x=0.0002, 0.0010, and 0.0050 moles) and $SiO_2$ (x=0.002, 0.0010, and 0.0050 moles). Barium fluoride, $BaF_2$, was added as a flux substituting for 10 mole percent of the $BaCO_3$. The precursor compounds were mixed together and wet milled for 4 hours using YTZ beads. The pH of the milled slurry was adjusted with ammonia to have a pH of above 8.0 in order to cause the soluble additives, primarily Hf or Zr precursors, to precipitate. The milled mixture was then filtered, oven dried at 120° C., crushed and fired at 1625° C. for about 1 to about 4 hours in a 75% $H_2$/25% $N_2$ atmosphere. The presence of barium magnesium aluminate was confirmed by x-ray diffraction; no minor phases were detected. The phosphors exhibited the characteristic blue emission peak at about 450 nm under UV and VUV excitation.

The initial brightness of each phosphor sample was measured to be within a few percent of the brightness of a standard BAM phosphor. The samples containing 0.5 mole % Hf, Zr and Si were hard pressed into a recess in a copper holder in order to dissipate excess heat during testing. The samples were then irradiated in a vacuum with 193 nm VUV radiation from a Lambda-Physik Compex 110 excimer laser. Incident power density was maintained at about 1.75 W/cm$^2$. A ten-minute irradiation time was selected to avoid the nearly complete saturation in degradation of the top surface of the plaque observed with prolonged exposures (e.g., an hour or more). Compared to the control phosphor, the samples doped with Si, Hf and Zr exhibited about 10% greater brightness under the same conditions. These results are summarized in Table 1. Brightness was measured as the integrated visible radiance in the range 350–600 nm under 250 nm excitation and is reported in relative units.

TABLE 1

| Sample (mole %) | Initial Brightness (Rel. Units) | Brightness after 193 nm irradiation (Rel. Units) | Brightness vs. control after 193 nm irradiation |
|---|---|---|---|
| Control | 1.0 | 0.648 | 100.0% |
| 0.5 Hf | 1.0 | 0.707 | 109.1% |
| 0.5 Zr | 1.0 | 0.717 | 110.7% |
| 0.5 Si | 1.0 | 0.698 | 107.8% |

The 0.5 mole % samples were also examined for their performance following exposure to a high-VUV-flux Xe discharge and an oxidizing heat treatment. In the first instance, the samples were exposed to 147/172 nm radiation from a Xe discharge for a 2-hour period in a vacuum. The power density of the incident VUV radiation was about 90 mW/cm$^2$. As can be seen from the data in Table 2, the samples which were doped with $Zr^{4+}$ and $Si^{4+}$ cations exhibited a higher stability under the 2-hour exposure than the control sample. The sample doped with 0.5 mole % Hf exhibited a slightly inferior behavior under these conditions relative to the control. In the second test, the phosphor samples were heated in air for 1 hour at 450° C. to simulate conditions used in the manufacture of plasma display panels. The phosphors which were doped with Zr and Si exhibited better brightness than the control after the 1-hour heat treatment at 450° C. The sample doped with 0.5 mole % Hf did not enhance the stability of the phosphor under these conditions.

TABLE 2

| | Brightness under 147/172 nm Xe discharge | | | | |
|---|---|---|---|---|---|
| Sample (mole %) | untreated (Rel. Units) | VUV-treated (Rel. Units)) | Change relative to control | Heat-treated (Rel. Units) | Change relative to control |
| control | 99.5 | 71.9 | 100.0% | 90.5 | 100.0% |
| 0.5 Hf | 100.7 | 69.7 | 96.9% | 91.5 | 99.9% |
| 0.5 Zr | 99.7 | 74.2 | 103.2% | 93.2 | 107.1% |
| 0.5 Si | 101.5 | 78.6 | 109.3% | 97.6 | 105.7% |

Fluorescent lamps were constructed in order to determine the performance of the phosphors under high wall loadings. The lamps were an electrodeless compact fluorescent type having a wall loading of about 0.1 to 0.2 W/cm$^2$. The phosphors were applied to the interior surface of the lamp envelope using a conventional organic-based coating technique. Two test lamps were made for each phosphor. Radiance values (integrated from 350–700 nm) were measured for each lamp before and after ~500 hours of operation. The average radiance values are given in Table 3 in arbitrary units (a.u.). The average radiance maintenance of the lamps (500 h radiance/0 h radiance) is given relative to the average radiance maintenance of control lamps.

TABLE 3

| Sample (mole %) | Ave. 0 h radiance (a.u.) | Ave. 500 h radiance (a.u.) | Ave. Rel. Maintenance |
|---|---|---|---|
| control | 8.977 | 5.815 | 100.0% |
| 0.02 Hf | 8.487 | 5.216 | 94.9% |
| 0.5 Hf | 9.105 | 5.545 | 94.1% |
| 0.02 Si | 10.08 | 6.398 | 98.1% |
| 0.5 Si | 9.512 | 6.079 | 98.6% |
| 0.02 Zr | 9.352 | 6.252 | 103.2 |
| 0.5 Zr | 9.884 | 6.987 | 109.2 |

In almost all cases, the average 0 h radiance for the lamps containing the phosphors doped with the tetravalent ions was greater than the average for the lamps containing the control phosphor. Under these tests conditions, the lamps containing the Zr and Si-doped phosphors continued to exhibit a higher radiance than the control lamps after ~500 hours of operation. In terms of relative radiance maintenance, the lamps coated with the Zr-doped phosphor outperformed the control lamps.

The data from the various test environments demonstrate that the tetravalent dopants can improve the stability of BAM phosphors under harsh conditions. The performance of the Hf, Si and Zr dopants varied depending on the test environment with the Zr-doped phosphors exhibiting an improved stability under all test conditions.

While there has been shown and described what are at the present considered the preferred embodiments of the invention, it will be obvious to those skilled in the art that various changes and modifications may be made therein without departing from the scope of the invention as defined by the appended claims.

We claim:

1. A europium-activated barium magnesium aluminate phosphor containing an amount of a dopant selected from silicon, hafnium, zirconium or a combination thereof.

2. The phosphor of claim 1 wherein the phosphor contains from greater than 0 to about 2000 ppm silicon by weight.

3. The phosphor of claim 1 wherein the phosphor contains from about 100 to about 400 ppm silicon by weight.

4. The phosphor of claim 1 wherein the phosphor contains from about 100 to about 200 ppm silicon by weight.

5. The phosphor of claim 1 wherein the phosphor contains from greater than 0 to about 6500 ppm zirconium by weight.

6. The phosphor of claim 1 wherein the phosphor contains from about 300 to about 1300 ppm zirconium by weight.

7. The phosphor of claim 1 wherein the phosphor contains from about 300 to about 650 ppm zirconium by weight.

8. The phosphor of claim 1 wherein the phosphor contains from greater than 0 to about 12500 ppm hafnium by weight.

9. The phosphor of claim 1 wherein the phosphor contains from about 600 to about 2500 ppm hafnium by weight.

10. The phosphor of claim 1 wherein the phosphor contains from about 600 to about 1300 ppm hafnium by weight.

11. The phosphor of claim 1 wherein the phosphor contains from about 1 to about 5 weight percent europium.

12. The phosphor of claim 1 wherein the phosphor contains about 2 weight percent europium.

13. The phosphor of claim 11 wherein the phosphor contains from greater than 0 to about 2000 ppm silicon by weight.

14. The phosphor of claim 11 wherein the phosphor contains from greater than 0 to about 6500 ppm zirconium by weight.

15. The phosphor of claim 11 wherein the phosphor contains from greater than 0 to about 12500 ppm hafnium by weight.

16. A phosphor having a composition represented by $(Ba_{1-x}Eu_x)MgAl_{10}O_{17}:(Hf,Zr,Si)_y$ where $0.05 \leq x \leq 0.25$ and $0 < y \leq 0.05$.

17. The phosphor of claim 16 wherein $0.0025 \leq y \leq 0.01$.

18. The phosphor of claim 16 wherein $0.0025 \leq y \leq 0.005$.

19. The phosphor of claim 16 wherein x is 0.1.

20. The phosphor of claim 17 wherein x is 0.1.

21. The phosphor of claim 18 wherein x is 0.1.

* * * * *